(12) United States Patent
Hikmet et al.

(10) Patent No.: US 12,390,985 B2
(45) Date of Patent: Aug. 19, 2025

(54) METHOD OF MANUFACTURING A 3D ITEM BY MEANS OF FUSED DEPOSITION MODELING

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/848,384

(22) PCT Filed: Mar. 28, 2023

(86) PCT No.: PCT/EP2023/057978
§ 371 (c)(1),
(2) Date: Sep. 18, 2024

(87) PCT Pub. No.: WO2023/186879
PCT Pub. Date: Oct. 5, 2023

(65) Prior Publication Data
US 2025/0196433 A1    Jun. 19, 2025

(30) Foreign Application Priority Data
Apr. 1, 2022    (EP) .................................... 22166253

(51) Int. Cl.
*B29C 64/00* (2017.01)
*B29C 64/118* (2017.01)
(Continued)

(52) U.S. Cl.
CPC ............ *B29C 64/118* (2017.08); *B33Y 10/00* (2014.12); *B33Y 70/10* (2020.01); *B33Y 80/00* (2014.12);
(Continued)

(58) Field of Classification Search
None
See application file for complete search history.

(56) References Cited

U.S. PATENT DOCUMENTS

2017/0306221 A1* 10/2017 Koole ................... C03C 14/004
2018/0236712 A1*  8/2018 Hikmet ................. B33Y 80/00
(Continued)

FOREIGN PATENT DOCUMENTS

DE        102019109709 A1    10/2020
WO          2019109709 A1     6/2019
WO          2021094206 A1     5/2021

*Primary Examiner* — Gerald J Sufleta, II

(57) ABSTRACT

The invention relates to a method of manufacturing a 3D item by means of fused deposition modeling. The method comprises the step of depositing a 3D printable material to form a layer stack of 3D printed material, wherein each layer of the layer stack has a layer height and a layer width. The 3D printable material comprises a thermoplastic polymer and light transmissive particles. The layer stack comprises a plurality of the light transmissive particles, each light transmissive particle having a particle width, being the dimension of the light transmissive particle in a direction parallel to the layer width. For the plurality of light transmissive particles, each ratio of the particle width and the layer width is at least 0.6 so that, in the layer stack, the plurality of light transmissive particles forms a plurality of pinholes delimited by a wall part. When the 3D item is illuminated by a light source, the pinholes create relatively small virtual light sources on the surface of the 3D item, opposite to the surface that is illuminated by the light source, thereby providing a sparkling light effect for an observer looking at the 3D item.

12 Claims, 7 Drawing Sheets

(51) Int. Cl.
  *B33Y 10/00* (2015.01)
  *B33Y 70/10* (2020.01)
  *B33Y 80/00* (2015.01)
  *F21V 1/14* (2006.01)
  *B29L 31/00* (2006.01)

(52) U.S. Cl.
  CPC ...... *F21V 1/146* (2013.01); *B29K 2995/0026* (2013.01); *B29L 2031/747* (2013.01)

(56) References Cited

U.S. PATENT DOCUMENTS

2021/0023773 A1* 1/2021 Gruhlke .................. C08K 7/16
2022/0288859 A1* 9/2022 Schiel .................... B33Y 40/00
2023/0025476 A1* 1/2023 Castillo .................. G02F 1/161

* cited by examiner $$0.8 \leq d/W_2 < 1$$

METHOD OF MANUFACTURING A 3D ITEM BY MEANS OF FUSED DEPOSITION MODELING

CROSS-REFERENCE TO PRIOR APPLICATIONS

This application is the U.S. National Phase application under 35 U.S.C. § 371 of International Application No. PCT/EP2023/057978, filed on Mar. 28, 2023, which claims the benefit of European Patent Application No. 22166253.9, filed on Apr. 1, 2022. These applications are hereby incorporated by reference herein.

FIELD OF THE INVENTION

The invention relates to a method of manufacturing a 3D item by means of 3D printing, in particular by means of fused deposition modeling. The invention also relates to a 3D item obtainable with such a method of manufacturing, and to a lighting device comprising such a 3D item.

BACKGROUND OF THE INVENTION

Digital manufacturing is expected to increasingly transform the nature of global manufacturing. One of the main processes used in digital manufacturing is 3D printing. The term "3D printing" refers to processes wherein a material is joined or solidified under computer control to create a three-dimensional object of almost any shape or geometry. Such three-dimensional objects are typically produced using data from a three-dimensional model, and usually by successively adding material layer by layer.

Many different 3D printing technologies are known in the art. One such technology is known as fused deposition modeling (FDM), also called fused filament fabrication (FFF) or filament 3D printing (FDP).

FDM is one of the most commonly used forms of 3D printing. In an FDM process, a 3D printer creates an object (hereinafter referred to as a 3D item) in a layer-by-layer manner by extruding a printable material along tool paths that are generated from a digital representation of the object.

The printable material is typically a filament of a thermoplastic material. A filament is a wire-like structure that can be wrapped or wound around a spool.

The printable material is heated just beyond solidification and extruded through a nozzle of a print head of the 3D printer. The extruded printable material fuses to previously deposited material and solidifies upon a reduction in temperature. In a typical 3D printer, the printable material is deposited as a sequence of planar layers onto a substrate that defines a build plane. The position of the print head relative to the substrate is then incremented along a print axis (perpendicular to the build plane), and the process is repeated until the object is complete.

FDM printers are relatively fast, low cost and can be used for printing complicated three-dimensional objects. Such printers are used in printing various shapes using various 3D printable materials. The technique is also being further developed in the production of LED luminaires and lighting solutions.

DE-102019109709 discloses a lighting device having an optical element with embedded particles for mechanical and thermal stability. The optical element is planar and the embedded particles have a diameter that is approximately equal to the thickness of the planar optical element. The particles, and the material they are embedded in, are light transmissive, so that refraction of light by the particles can provide a crystal or glitter effect.

SUMMARY OF THE INVENTION

In the production of luminaires and lighting solutions, FDM can be used to manufacture a 3D item that is configured as a component of a luminaire or lighting device, such as one or more of (i) at least part of a luminaire or lighting device housing, (ii) at least part of a wall of a lighting chamber, and (iii) an optical element.

For use as such a component, it may be desired that the 3D item can provide a certain optical effect by interacting with light that is emitted by a light source of the luminaire or lighting device. Such an optical effect may add to the aesthetic or decorative appearance of the luminaire or lighting device.

It is an object of the invention to provide a 3D item that can be used as a component of a luminaire or lighting device, wherein the 3D item can add to the aesthetic or decorative appearance of the luminaire or lighting device by interacting with light that is emitted by a light source of the luminaire or lighting device.

In a first aspect, the invention provides a method for manufacturing a 3D item by means of fused deposition modeling.

In a second aspect, the invention provides a 3D item obtainable with the method according to the first aspect.

The method according to the first aspect of the invention comprises the step of depositing a 3D printable material to form a layer stack of 3D printed material, each layer of the layer stack having a layer height and a layer width.

The 3D printable material comprises a thermoplastic polymer and light transmissive particles.

The layer stack of 3D printed material comprises a plurality of the light transmissive particles, each light transmissive particle having a particle width, wherein the particle width is the dimension of the light transmissive particle in a direction parallel to the layer width.

For the plurality of light transmissive particles comprised in the layer stack of 3D printed material, each ratio of the particle width and the layer width is at least 0.6.

The method comprises the step of layer-wise depositing a 3D printable material to form a stack of 3D printed material. Herein, the term "3D printable material" refers to the material to be deposited or printed, while the term "3D printed material" refers to the material that is obtained after deposition. These materials may be essentially the same, as the 3D printable material may refer to the material in the print head at elevated temperature and the 3D printed material refers to the same material, but in a later stage when deposited.

The term "3D printable material" may refer to a single type of printable material but it may also refer to a plurality of different printable materials. Similarly, the term "3D printed material" may refer to a single type of printed material but it may also refer to a plurality of different printed materials.

Materials that may qualify as 3D printable materials can be selected from the group consisting of metals, glasses, (thermoplastic) polymers, and silicones.

The 3D printable material used in the method according to the first aspect comprises one or more thermoplastic polymers.

In general, a thermoplastic polymer has a glass transition temperature and/or a melting temperature. Before it leaves the nozzle of the print head, the 3D printable material will be heated to a temperature of at least the glass transition temperature, and in general at least the melting temperature.

The glass transition temperature is in general not the same thing as the melting temperature. Melting is a transition which occurs in crystalline polymers. Melting happens when the polymer chains fall out of their crystal structures and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

Materials that qualify as 3D printable materials may be selected from the group consisting of metals, glasses, (thermoplastic) polymers, and silicones.

Polymers, such as thermoplastic polymers, suitable for use as 3D printable material in the method according to the first aspect can be selected from the group consisting of ABS (acrylonitrile butadiene styrene), nylon (or polyamide), acetate (or cellulose), PLA (polylactic acid), terephthalate (such as polyethylene terephthalate), acrylic (polymethylacrylate, Perspex, polymethylmethacrylate, PMMA), polypropylene (or polypropene), polycarbonate (PC), polystyrene (PS), PE (such as expanded high-impact-polythene (or polyethene), low-density PE (LDPE), high-density PE (HDPE)), PVC (polyvinyl chloride), polychloroethene, such as thermoplastic elastomers based on copolyester elastomers, polyurethane elastomers, polyamide elastomers, polyolefine-based elastomers, and styrene-based elastomers.

The 3D printable material may comprise a material selected from the group consisting of urea formaldehyde, polyester resin, epoxy resin, melamine formaldehyde, and thermoplastic elastomer.

The 3D printable material may be a polysulfone.

Elastomers, such as thermoplastic elastomers, may be interesting as they are flexible and may help to obtain relatively more flexible filaments. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials for use as 3D printable material, may include one or more of polyacetals (for example, polyoxyethylene and polyoxymethylene), poly($C_{1-6}$ alkyl) acrylates, polyacrylamides, polyamides, (for example, aliphatic polyamides, polyphthalamides, and polyaramides), polyamideimides, polyanhydrides, polyarylates, polyarylene ethers (for example, polyphenylene ethers), polyarylene sulfides (for example, polyphenylene sulfides), polyarylsulfones (for example, polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (for example, polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl) methacrylates, polymethacrylamides, polynorbornenes (including copolymers containing norbornenyl units), polyolefins (for example, polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers.

Examples of polyamides may include, but are not limited to, synthetic linear polyamides, for example Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl) acrylates and poly($C_{1-6}$ alkyl) methacrylates, which include, for instance, polymers of methyl acrylate, ethyl acrylate, acrylamide, methacrylic acid, methyl methacrylate, n-butyl acrylate, and ethyl acrylate. A polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

The 3D printable material (and the 3D printed material) may comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA).

The term 3D printable material may refer to a thermoplastic material, optionally including additives, to a volume percentage of at maximum about 60% (by volume), such as at maximum about 30% (by volume), or at maximum 20% (by volume).

The 3D printable material may comprise two phases. The 3D printable material may comprise a phase of printable polymeric material, such as a thermoplastic material, which phase may be an essentially continuous phase. In this continuous phase of thermoplastic material, additives such as one or more of antioxidants, heat stabilizers, light stabilizers, ultraviolet light stabilizers, ultraviolet light absorbing additives, near infrared light absorbing additives, infrared light absorbing additives, plasticizers, lubricants, release agents, antistatic agents, anti-fog agents, antimicrobial agents, colorants, laser marking additives, surface effect additives, radiation stabilizers, flame retardants, and anti-drip agents may be present. The additive may have useful properties selected from optical properties, mechanical properties, electrical properties, thermal properties, and mechanical properties.

In the method according to the first aspect, the 3D printable material is deposited to form a layer stack of 3D printed material, wherein each layer of the layer stack has a layer height and a layer width. The height of a layer in a layer stack is the dimension of the layer as measured in a direction parallel to the stacking direction, or, in other words, in a direction perpendicular to the substrate (or carrier) of the layer stack. The width of a layer in a layer stack is the dimension of the layer as measured in a direction perpendicular to the stacking direction. In other words, the width of the layer is measured perpendicular to the height of the layer.

Next to one or more thermoplastic polymers, the 3D printable material used in the method according to the first aspect also comprises light transmissive particles.

A light transmissive particle is a particle that allows electromagnetic radiation, particularly radiation in the visible part of the electromagnetic spectrum (i.e., visible light), to pass through. A light transmissive particle may be a translucent particle or a transparent particle.

A translucent material allows light to pass through, but in doing so the photons may be scattered, either at the surface of the particle or internally, where there is a change in index of refraction. A translucent material that exhibits light scattering may also be referred to as a diffusely transmissive material.

A transparent material also allows light to pass through, but now without appreciable scattering of light.

Each light transmissive particle included in the 3D printable material has a minimum bounding box.

The minimum bounding box is a (imaginary) box in the shape of a rectangular cuboid having the smallest volume within which the particle would still fit. This minimum bounding box can be characterized by three mutually perpendicular bounding box dimensions, which may be referred to as the bounding box length, the bounding box width, and the bounding box height, respectively.

The concept of a minimum bounding box allows the size of arbitrarily-shaped particles to be unambiguously defined.

The layer stack of 3D printed material that is created with the method according to the first aspect comprises a plurality of the light transmissive particles that are included in the 3D printable material.

For this plurality of light transmissive particles that is comprised in the layer stack, each light transmissive particle has a particle width. The particle width is the dimension of the light transmissive particle in a direction parallel to the layer width of the layer wherein that particle is present. The particle width may be one of the three mutually perpendicular bounding box dimensions.

Furthermore, for the plurality of light transmissive particles that is comprised in the layer stack, each ratio of the particle width and the layer width is at least 0.6, such as at least 0.8, or at least 0.9, or substantially equal to 1, or larger than 1.

For example, the ratio of the particle width and the layer width is equal to 1, or approximately equal to 1. In that case, the width of the light transmissive particle is substantially the same as the width of the layer it is in. Because the width of the light transmissive particle and the width of the layer are two mutually parallel dimensions, the light transmissive particle can be said to bridge (or span) the layer in the width direction.

By bridging (or spanning) the layer in the width direction, the light transmissive particle forms a channel that allows light to pass through the layer in the width direction. Hereinafter, such a channel is also referred to as a pinhole. When the 3D item is illuminated by light from a light source, the pinhole essentially creates a relatively small virtual light source on the surface of the 3D item, opposite to the surface that is illuminated by the light source. This virtual light source then provides a sparkling light effect for an observer looking at the 3D item.

In other words, the layer stack that is formed with the method according to the first aspect comprises a plurality of light transmissive particle, wherein each light transmissive particle forms a pinhole in a layer of the layer stack. The plurality of light transmissive particles consists of N light transmissive particles, wherein N may be at least 50, or at least 100, or at least 250, such as 500 or 1000.

When the ratio of the particle width and the layer width is less than 1, the width of the light transmissive particle is less than the width of the layer it is in. The light transmissive particle would then, in the width direction, still be covered by material of the layer. However, when the ratio of the particle width and the layer width is not less than 0.6, such as not less than 0.8, or not less than 0.9, the amount of material that still covers the particle is so small that some light will still be able to pass through the material such that, essentially, the particle still forms a pinhole in the layer. At the location of the particle, the light transmissivity of the layer is increased, and the 3D item is still capable of producing a sparkling light effect upon illumination with light from a light source.

The absorbance of a layer of material increases with increasing thickness of the layer, and it increases with increasing absorptivity (or molar attenuation coefficient) of the material. For typical fused deposition modeling methods, using typical 3D printable materials, the restrictions of the aforementioned range for the ratio of particle width and layer width will ensure that the maximum amount of thermoplastic polymer that may still cover a light transmissive particle has a sufficient transmissivity for light to allow the formation of a pinhole at the location of the light transmissive particle.

The ratio of the particle width and the layer width may also be larger than 1. In that case, the width of the light transmissive particle is larger than the width of the layer it is in. A ratio of the particle width and the layer width being larger than 1 ensures that the light transmissive particles are exposed in the printed layers, thereby optimizing the formation of light transmissive pinholes in the printed layers, irrespective of what thermoplastic polymer is used in the 3D printable material. Even if the thermoplastic polymer would be opaque, the aforementioned ratio ensures the formation of pinholes. In other words, the aforementioned ratio allows the use of an opaque thermoplastic polymer, which would increase the contrast, and hence the visibility, of the desired sparkling effect.

The width of a layer of 3D printed material depends on the size of the nozzle opening. Typically the layer width is equal to, or slightly larger than, the size of the nozzle opening. A configuration wherein one or more particles are embedded in a layer that has a width smaller than that of the particles can be obtained by using particles of an elastically deformable material, wherein the particles have to be compressed to pass through the nozzle opening. The compression force is then provided by the nozzle opening, and after passing through the nozzle opening, the particles revert to their original size and shape.

In the method according to the first aspect, the 3D printable material comprises a thermoplastic polymer and particles. The particles should be light transmissive so that, under the restrictions of the ratio between particle width and layer width, pinholes are formed in the layer stack of 3D printed material. The thermoplastic polymer may also be light transmissive, but it does not have to be.

The method according to the first aspect results in the formation of a layer stack of 3D printed material, wherein the layer stack has a plurality of pinholes. The remaining part of the layer stack, being the part that delimits the pinholes, can be referred to as a wall part. The wall part comprises the thermoplastic polymer, but it does not comprise any light transmissive particles so that it is free of pinholes.

The pinholes of the layer stack are light transmissive. The wall part of the layer stack may be light transmissive, but instead it may also be opaque.

The wall part of the layer stack may be diffusely transmissive. A diffusely transmissive wall part is a translucent wall part that exhibits scattering of electromagnetic radiation. A diffusely transmissive wall part may have a certain reflectance for visible light, such as at least 30%, or at least 50%, or at least 80%. When combined with transparent particles, pinholes of a different transmissivity as compared to that of the wall part can be formed in the layer stack.

The wall part of the layer stack may be transparent. A transparent wall part is a translucent wall part that does not exhibit any appreciable scattering of electromagnetic radiation. A transparent wall part may be colorless (or clear), but it may also have a certain color. When combined with translucent particles, or when combined with transparent particles of a different color, pinholes of a different transmissivity as compared to that of the wall part can be formed in the layer stack. For example, the transparent wall part may have a first color, such as yellow, while the transparent particles have a second color, different from the first color, such as blue.

The wall part of the layer stack may also be opaque. As already mentioned before, the absorbance of a layer of material increases with increasing thickness of the layer, and it increases with increasing absorptivity (or molar attenuation coefficient) of the material. A layer of a thermoplastic polymer may therefore be opaque from a certain thickness onwards, while it is still capable of transmitting light at lower thicknesses. When the wall part of the layer stack is opaque, the contrast between light transmissivity of the pinholes and of the wall part can be maximized.

The 3D printable material used in the method according to the first aspect may be a filament of the thermoplastic polymer, wherein the light transmissive particles are embedded in the filament.

A filament for use in the method according to the first aspect comprises a thermoplastic polymer and light transmissive particles. The filament is a wire-like, elongated structure. It has a filament width, being the dimension of the filament in a direction perpendicular to the direction of elongation of the filament. In a plane perpendicular to the direction of elongation, the filament may have a round cross section. In this case, the filament width is equal to the diameter of the filament's cross section. The light transmissive particles are embedded in the filament. The light transmissive particles have a particle width, being the dimension of the light transmissive particle in a direction parallel to the filament width. When the light transmissive particles are spherical particles, the particle width is equal to the diameter of the particles.

In the aforementioned filament for use in the method according to the first aspect, a ratio of the particle width and the filament width is at least 0.5. Furthermore, the light transmissive particles are present in the filament at a concentration of 10 to 1000 particles per $cm^3$. The concentration of particles in 3D printable material is typically given in the number of particles per unit volume of 3D printable material.

The light transmissive particles may be beads. A bead is a particle with a spherical shape. Examples of suitable beads are glass beads. Glass beads are transparent spherical particles that have the property of focusing light, thereby enhancing the sparkling effect.

The light transmissive particles may also be polymer particles, such as polymer beads.

Such light transmissive polymer particles may be made from a material that has a relatively high glass transition temperature and/or melting temperature, so that during execution of the method, the nozzle temperature can be kept below the glass transition temperature and/or melting temperature of the light transmissive polymer particles.

Such light transmissive polymer particles may also be cross-linked polymer beads, such as silicone rubber beads, so that during execution of the method, the nozzle temperature may be higher than the glass transition temperature and/or melting temperature of the light transmissive polymer particles.

An advantage of using light transmissive polymer particles is that, due to their inherent flexibility, the chance of damaging the nozzle is reduced. Examples of suitable light transmissive polymer particles are silicon particles or silicon rubber beads.

The light transmissive particles may be colorless (or clear) particles, but they may also be colored particles, of a single color, or of two or more different colors. This allows the creation of (multi-) color sparkling effects.

As said, the 3D printable material used in the method according to the first aspect comprises a thermoplastic polymer and light transmissive particles. Next to these constituents, the 3D printable material may also comprise additional constituents.

For example, the 3D printable material may additionally comprise a dye or a pigment.

Next to the light transmissive particles, the 3D printable material may also comprise other types of particles. In that case, the 3D printable material can be said to comprise first particles, being the light transmissive particles, and second particles. The second particles may be significantly smaller than the first particles, such as at least ten times smaller. For spherical particles, the diameter is a measure of their size. For arbitrarily shaped particles, the largest of the three mutually perpendicular dimensions of the minimum bounding box is a measure of their size. Also, the second particles may have a concentration in the 3D printable material that is significantly larger than the concentration of the first particles, such as at least ten times larger. The concentration of particles in 3D printable material is typically given in the number of particles per unit volume of 3D printable material.

The 3D item according to the second aspect of the invention comprises a layer stack of 3D printed material, each layer of the layer stack having a layer height and a layer width.

The 3D printed material comprises a thermoplastic polymer and light transmissive particles.

The layer stack of 3D printed material comprises a plurality of the light transmissive particles, each light transmissive particle having a particle width, being the dimension of the light transmissive particle in a direction parallel to the layer width.

For the plurality of light transmissive particles, a ratio of the particle width and the layer width is at least 0.6, such as at least 0.8, or at least 0.9, or substantially equal to 1, or larger than 1.

The 3D item according to the second aspect of the invention can be obtained by the method according the first aspect of the invention.

In the 3D item according to the second aspect, the plurality of the light transmissive particles may be present in the layer stack of 3D printed material at a concentration in a range of 10 to 1000 particles per $cm^3$.

The 3D item according to the second aspect can be used as component of a lighting device. Such a lighting device would then also have a light source that is arranged to emit light towards the layer stack of 3D printed material that is part of the 3D item. Being a component of the lighting device, the 3D item may be configured as one or more of (i) at least part of a lighting device housing, (ii) at least part of a wall of a lighting chamber, and (iii) an optical element.

The method according to the first aspect can be performed by a 3D printer, for example by means of a computer program product comprising instructions which, when the computer program product is executed by the 3D printer, cause the 3D printer to carry out the method.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
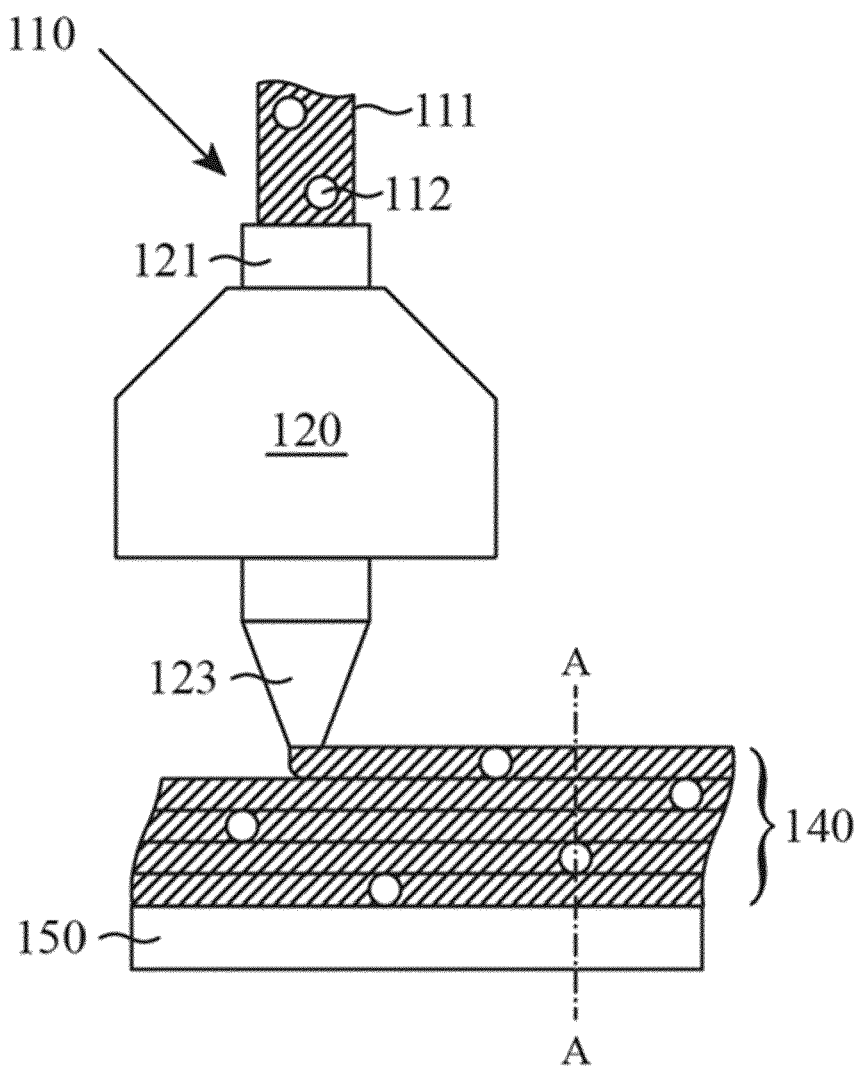
FIG. 1 schematically illustrates the process of fused deposition modeling.

FIG. 1 schematically illustrates the process of fused deposition modeling. Printable material 110 is fed to print head 120 of a 3D printer. The printable material 110 is heated, extruded through nozzle 123 of the print head 120, and deposited as a sequence of layers 140 onto substrate 150 that defines a build plane. In FIG. 1, A denotes an axis that is oriented perpendicular to the substrate 150.

The print head 120 has a single inlet 121 for receiving the printable material 110, which is in the form of a filament of a thermoplastic polymer 111 with embedded particles 112.

Figure 2:
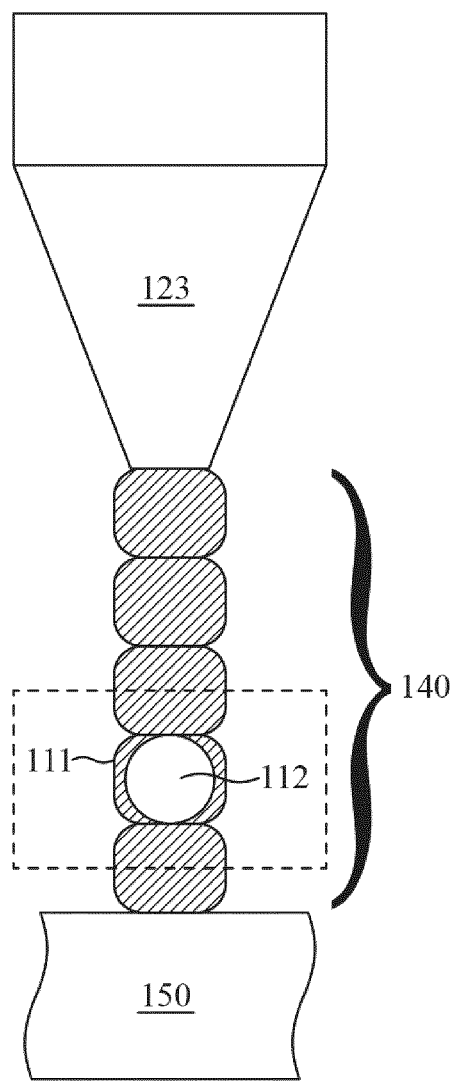
FIG. 2 shows a close-up of a layer stack.
Figure 3:
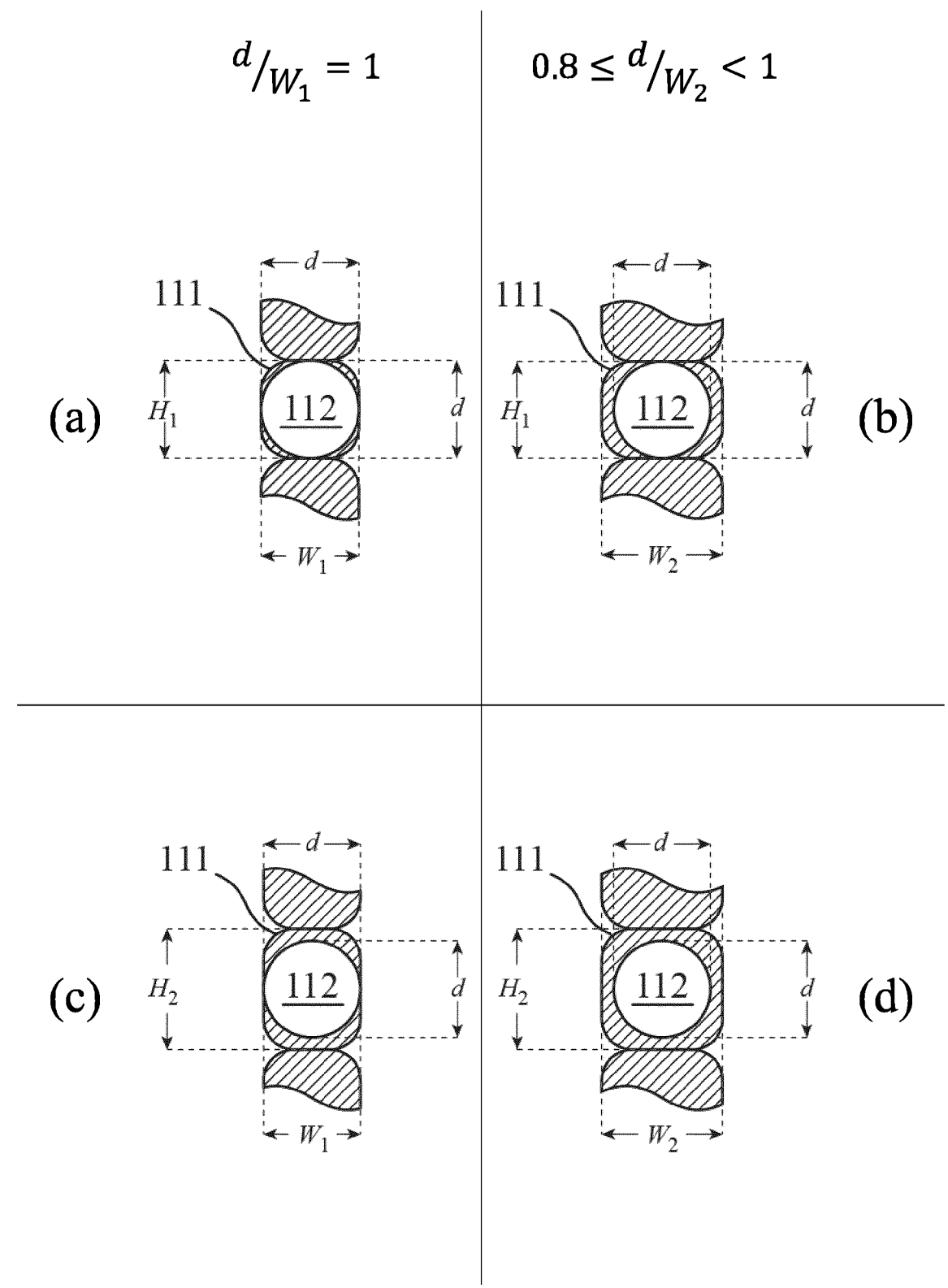
FIGS. 3(a) to 3(d) show close-ups of a layer in a layer stack.

FIG. 2 shows a close-up of the layers 140, viewed as a cross section with a plane that coincides with axis A as indicated in FIGS. 1(a) and 1(b). In the second layer deposited on the substrate 150, one can see particle 112 being embedded in the thermoplastic polymer 111. The dashed line indicates the area used for further close-ups in FIG. 3.

FIG. 3(a) shows a close-up of the deposited layer that has particle 112 being embedded in thermoplastic polymer 111.

The layer has a width $W_1$ and a height $H_1$. The height of a layer is the dimension of the layer as measured in a direction perpendicular to the substrate on which the layer has been deposited. The width of a layer is the dimension of the layer as measured perpendicular to the height of the layer.

The particle 112 is a spherical particle with diameter d. The diameter d of the particle 112 is substantially equal to the width $W_1$ of the layer. In other words, the ratio of the particle diameter d and the layer width $W_1$ is equal to, or approximately equal to, one.

The particle 112 is a light transmissive particle. This means that electromagnetic radiation, particularly radiation in the visible part of the electromagnetic spectrum, can pass through the particle. The particle 112 may be a translucent particle or a transparent particle. A translucent particle allows light to pass through, but in doing so the photons may be scattered, either at the surface of the particle or internally, where there is a change in index of refraction. A translucent particle may also be referred to as a diffusely transmissive particle. A transparent particle also allows light to pass through, but now without appreciable scattering of light.

The particle 112 may be a colorless (or clear) particle, but it may also be a colored particle.

In general, the particle 112 may be arranged to provide an optical effect chosen from the group consisting of refraction, diffraction, diffusion, and conversion.

The term "refraction" refers to the change in direction of a light ray passing from one medium to another or from a gradual change in the medium. Prisms and lenses may be used to redirect light by means of refraction.

The term "diffraction" refers to various phenomena that occur when a light ray encounters an obstacle or a slit. It may be defined as the bending of light rays around the corners of an obstacle or through an aperture into the region of geometrical shadow of the obstacle or aperture, wherein the diffracting object or aperture effectively becomes a secondary source of the propagating light ray.

The term "diffusion" refers to a situation wherein a light ray travels through a material without being absorbed, but rather undergoes repeated scattering events which change the direction of its path.

The term "conversion" refers to a change in wavelength of a light ray, such as by means of photoluminescence, wherein light is emitted from any form of matter after absorption of electromagnetic radiation. Conversion of light by means of photoluminescence may be achieved by using a phosphor.

Going back to FIG. 3(a), the particle 112 allows a light ray to pass through the layer. This is because the particle 112 is a light transmissive particle, and because it bridges the width $W_1$ of the layer. In other words, at the location of the particle 112, a pinhole is created in the layer.

FIG. 3(b) also shows a close-up of the deposited layer that has particle 112 being embedded in thermoplastic polymer 111. Again, the layer has a height $H_1$, and the particle 112 is a spherical particle with diameter d.

In FIG. 3(b), the width of the layer is $W_2$, which is (slightly) larger than the width $W_1$ of the layer shown in FIG. 3(a). In fact, in FIG. 3(b), the ratio of the particle diameter d and the layer width $W_2$ is less than one, but equal to or larger than 0.6. This has the consequence that the particle 112 does not fully bridge the width $W_2$ of the layer, but that on at least one side of the layer, the particle 112 is covered with the thermoplastic polymer 111. Under the restrictions of the aforementioned range for the ratio of the particle diameter and the layer width, the thickness of the thermoplastic polymer covering the particle 112 is at most 40% of the layer width. In practice, the maximum thickness, particularly when averaged over a large number of embedded particles, will be less because, on average, the particles will be more or less centrally embedded within a layer. For a typical layer width of 1 millimeter, the maximum thickness of the thermoplastic polymer covering the embedded particle will be about 200 micrometers. For such thicknesses, the thermoplastic polymers that are commonly used in fused deposition modeling will have a non-zero transmissivity for light. This means that, at the location of an embedded particle, a light ray will still be able to pass through the layer. In other words, also in this case there is a pinhole in the layer at the location of the particle 112.

The situations of FIGS. 3(c) and 3(d) are similar to those of FIGS. 3(a) and 3(b), respectively, but now the height of the layer is $H_2$, which is larger than the height $H_1$ of the layer shown in FIGS. 3(a) and 3(b). The height of the layer has no influence on the particle's ability to bridge the width of the layer, or to at least bridge a sufficiently large part of the layer, so that in turn it has no influence on the particle's ability to let a light ray pass through the layer.

In FIGS. 3(a) and 3(b), the layer height $H_1$ is substantially equal to the particle diameter d, while in FIGS. 3(c) and 3(d), the layer height $H_2$ is substantially larger than the particle diameter d. When the former applies, and especially when the layer height is less than the particle diameter, the particle 112 may be pushed into an underlying layer during deposition of the layers, which may in turn have negative consequences for the formation of a pinhole. Such negative consequences are prevented when the layer height is substantially larger than the particle diameter.

In FIGS. 3(a) to 3(d), the particle 112 is a spherical particle. For the purpose of the invention, which is to create a light transmissive pinhole in a deposited layer, it is not necessary that spherical particles are used. In fact, particles of any shape may be used, provided that they are light transmissive.

Irrespective of its actual shape or form, any particle can be characterized by a minimum bounding box. This is a (imaginary) box in the shape of a rectangular cuboid having the smallest volume within which the particle would still fit. This minimum bounding box can be characterized by three mutually perpendicular bounding box dimensions, which may be referred to as the bounding box length, the bounding box width, and the bounding box height, respectively. The largest of these bounding box dimensions may be referred to as the maximum dimension of the particle that fits inside the box. For a particle that is embedded in a layer, the bounding box dimension that extends parallel to the width of the layer may be referred to as the width of the particle, and the bounding box dimension that extends parallel to the height of the layer may be referred to as the height of the particle.

If the particle is a sphere, the minimum bounding box is a cube. The edges of the cube are all equal to the diameter of the sphere that fits inside. The diameter of the sphere represents the maximum dimension of the particle. There are also other particle shapes for which the minimum bounding box is a cube. The maximum dimension of these particles is equal to the diameter of the largest sphere that would still fit inside the cube.

If the particle is a spheroid, the minimum bounding box is an elongated rectangular cuboid. One of the three mutually perpendicular bounding box dimensions of such a box is larger than each of the other two. This largest dimension is typically called the length of the box, and it represents the maximum dimension of the particle that fits inside.

For a particle of arbitrary shape that is embedded in a layer, the bounding box dimension of the particle's minimum bounding box that extends parallel to the width of the layer in which the particle is embedded is referred to as the particle width.

When, for the combination of that particle and the layer it is embedded in, the ratio of the particle width and the layer width is at least 0.6, the particle will bridge the width of the layer in which it is embedded, or it will at least bridge a sufficiently large part of the layer, so that a pinhole is created, and light can pass through the layer at the location of the embedded particle.

Figure 4:
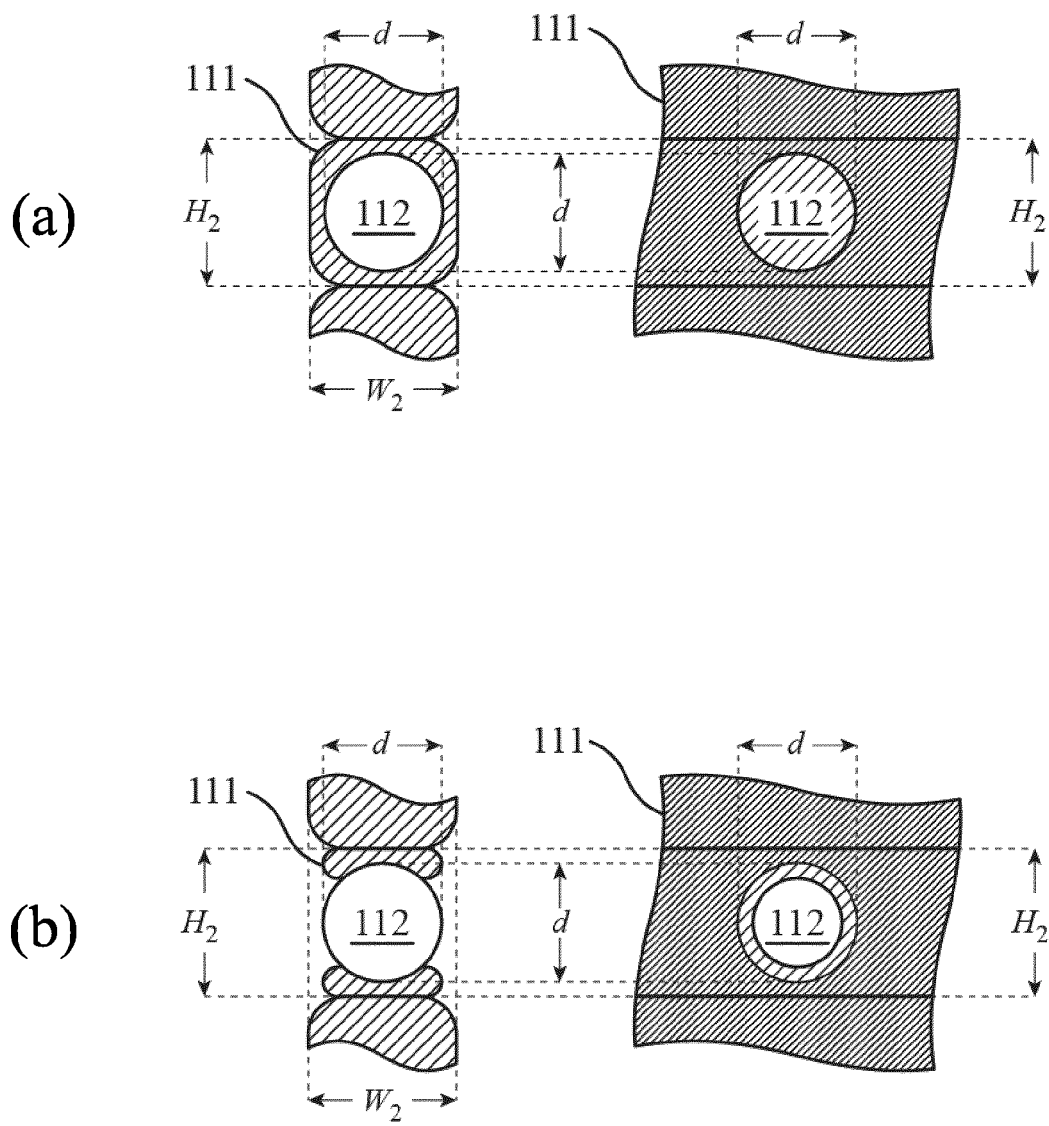
FIGS. 4(a) and 4(b) show close-ups of a layer in a layer stack.

The left part of FIG. 4(a) shows the same situation as that of FIG. 3(d). The right part of FIG. 4(a) again shows the same situation, but now when viewed in a direction parallel to the layer width $W_2$. In the right view, the particle 112 is shown as a hatched area to indicate that it is covered by thermoplastic polymer. As explained above, the thickness of this thermoplastic polymer covering is not such that it completely blocks light from passing through the layer at the location of the particle 112.

FIG. 4(b) shows a situation wherein the surface of the particle 112 is not compatible with the thermoplastic polymer. Under the restrictions of the range for the particle width and the layer width, the amount of thermoplastic polymer that would still cover the particle in the direction of the layer width is then so limited that the (incompatible) thermoplastic polymer will not adhere to and hence fall off the surface of the particle, thereby exposing at least a part of the particle. In FIG. 4(b), the embedded particle 112 is in this way exposed on opposite sides. The transmissivity, and also the aperture, of the pinhole has hereby increased compared to the situation of FIG. 4(a).

The aforementioned incompatibility can be the result of a difference in chemical polarity. For example, when particles with a polar surface are embedded in an apolar thermoplastic polymer, the incompatibility between the polar particles and the apolar thermoplastic polymer may result in the aforementioned exposure of the particles due to non-adherence of the thermoplastic polymer. Examples of particles with a polar surface are glass particles, such as glass beads. Particles with an apolar surface can be obtained through a surface treatment, for example a silane surface treatment.

Incompatibility between the particles and the thermoplastic polymer can result in exposure of the particles due to non-adherence of the thermoplastic polymer to the surface of the particles. The non-adherence of the thermoplastic polymer to the surface of a particle may even result in a particle falling out of the layer of 3D printed material, thereby leaving a through hole in the layer at the location where the particle used to be. This through hole now forms a pinhole in the layer, similar to what the particle would have done if it were still present in the layer.

By on purpose using a combination of a thermoplastic polymer and particles that are incompatible with the thermoplastic polymer, one may ensure that at least a substantial number of the particles, or even all particles, fall out of the layer of 3D printed material, leaving through holes where the particles used to be, which in turn form pinholes in the layer. In this case, the particles do not even have to be light transmissive, because the pinholes are formed by the through holes that remain in the layer of 3D printed material after the particles have fallen out.

Figure 5:
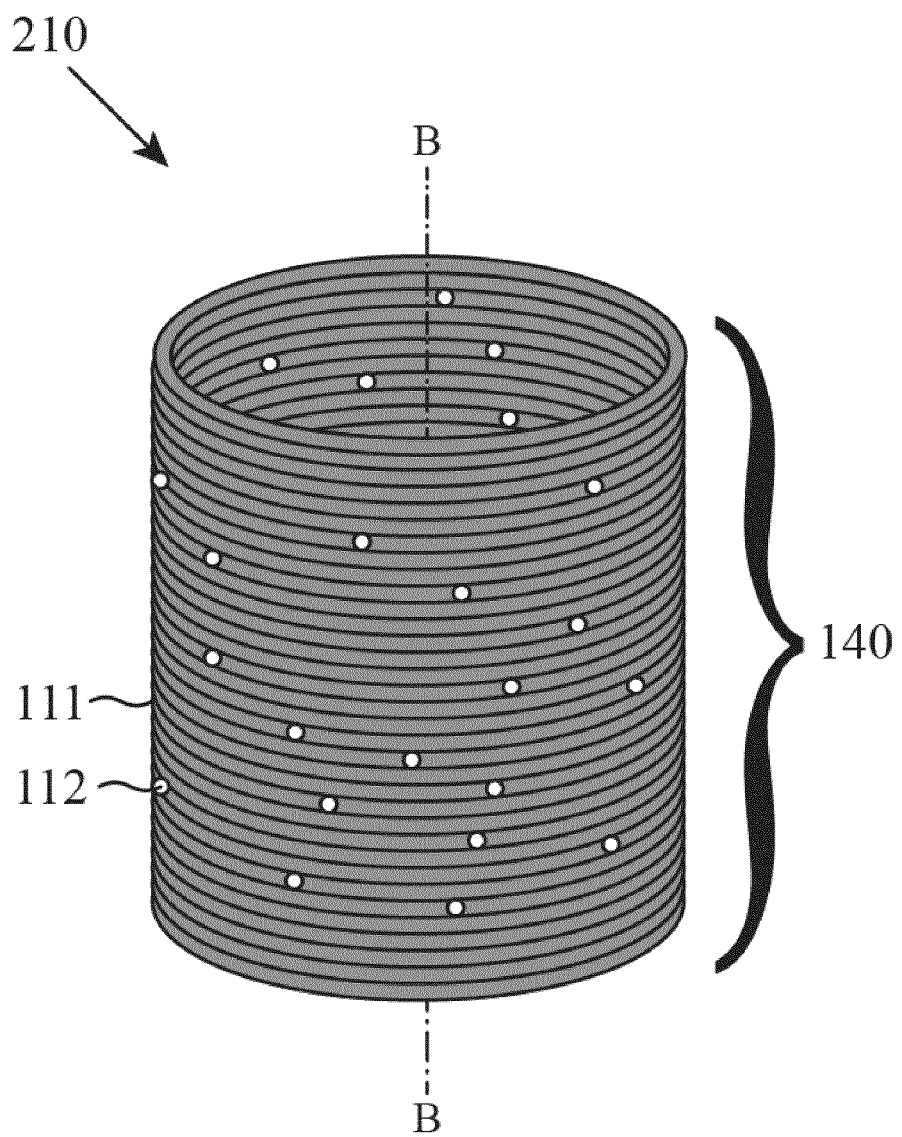
FIG. 5 shows a 3D item that has been manufactured by means of fused deposition modeling.

FIG. 5 shows 3D item 210 that has been manufactured by means of the method according to the invention. The 3D item 210 is a hollow cylinder, wherein B denotes the axis of the cylinder.

The 3D item 210 comprises a stack of layers 140. Each layer 140 comprises the thermoplastic polymer 111, and at least some layers 140 also comprise one or more light transmissive particles 112. At the location of such a light transmissive particle 112, a pinhole is formed in the stack of layers 140. The light transmissive particles 112, and hence the pinholes, are randomly distributed over the stack of layers 140.

The light transmissive particles 112 used in manufacturing the 3D item 210 are glass spheres with a diameter of 0.8 millimeters. These glass spheres are embedded in a filament made of polypropylene, at a concentration of one particle per 20 mm$^3$ of filament, which is equivalent to 50 particles per cm$^3$ of filament. Next to polypropylene and glass spheres, the filament also comprises scattering particles. The aforementioned filament was fed to a print head having a nozzle with an opening of 1 millimeter, and the print head was controlled to deposit layers with a layer height of 0.8 millimeters, which is substantially equal to the diameter of the glass spheres.

It is noted that the above experimental details are merely an example, and that alternative experiments may be performed using different materials and/or different parameter settings.

Figure 6:
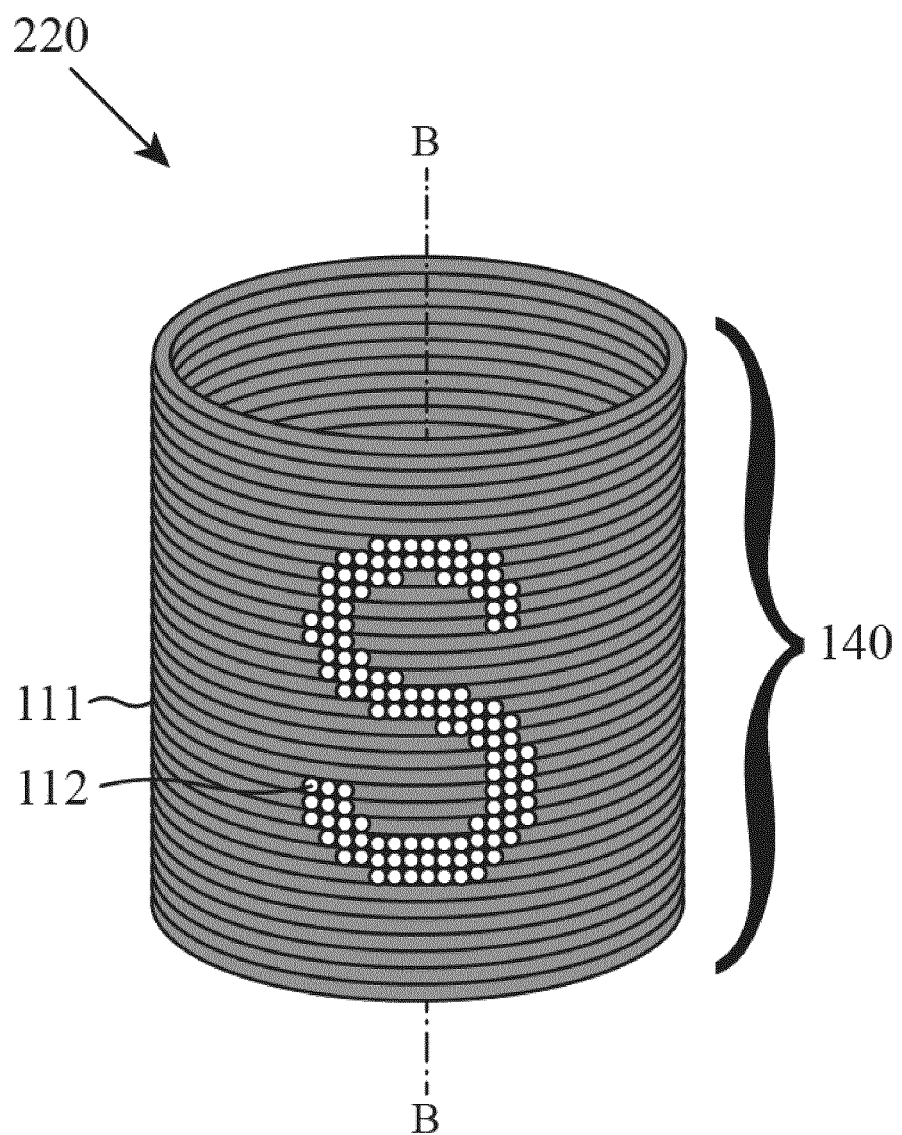
FIG. 6 shows a 3D item that has been manufactured by means of fused deposition modeling.

FIG. 6 shows 3D item 220 that has been manufactured by means of the method according to the invention. The 3D item 220 is a hollow cylinder, wherein B denotes the axis of the cylinder.

The 3D item 220 comprises a stack of layers 140. Each layer 140 comprises the thermoplastic polymer 111, and at least some layers 140 also comprise one or more light transmissive particles 112. At the location of such a light transmissive particle 112, a pinhole is formed in the stack of layers 140.

In the 3D item 220 illustrated in FIG. 6, the light transmissive particles 112, and hence the pinholes, are distributed over the stack of layers 140 in a predetermined pattern. Here, the predetermined pattern is in the form of the letter S, but any other predetermined pattern would be possible.

A predetermined pattern of pinholes, as illustrated in FIG. 6, can be obtained by using a computer-controlled needle and/or pick-and-place device to determine where in the filament the light transmissive particles should be placed so that after printing the predetermined pattern is obtained on the 3D item. Alternatively, one may use a 3D printer with a print head having a first inlet for receiving the transmissive polymer at a first feed rate and a second inlet for receiving the light transmissive particles at a second feed rate, wherein the 3D printer further has a controller for controlling a ratio of the first feed rate and the second feed rate.

Figure 7:
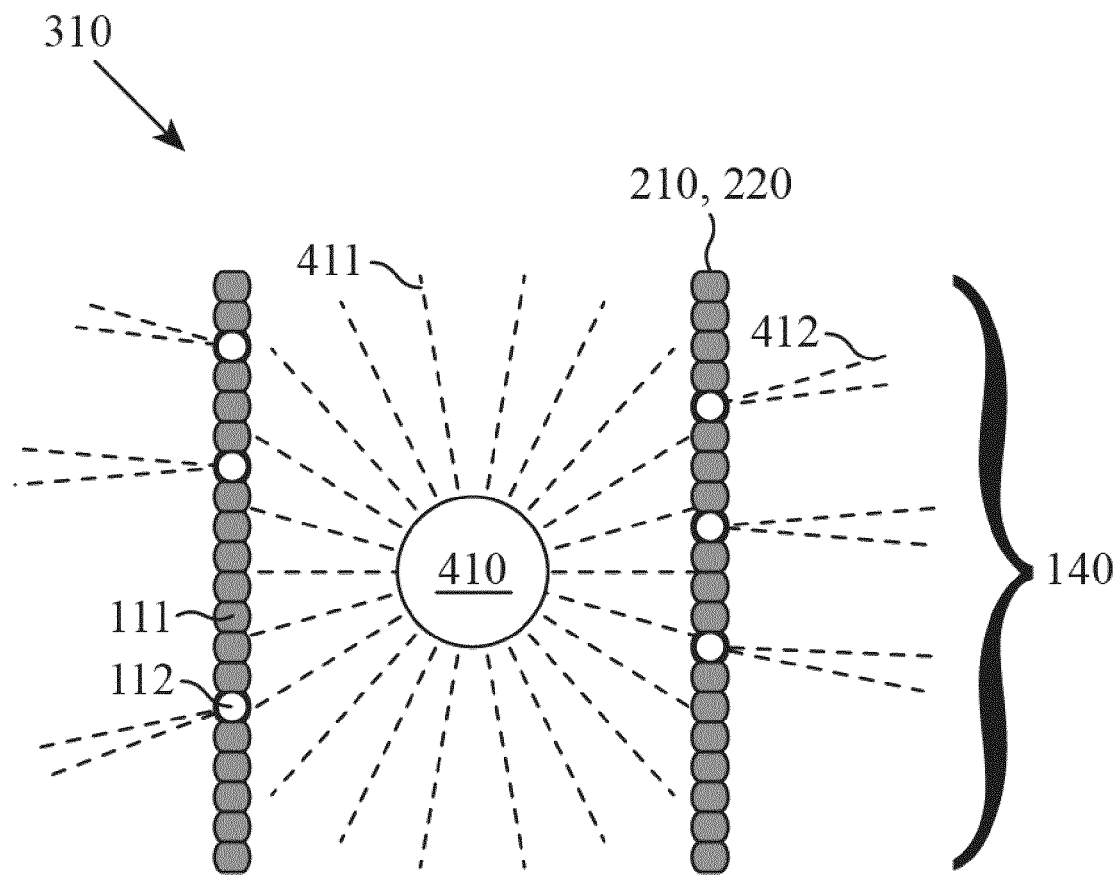
FIG. 7 shows a lighting device having a light source and a 3D item.

FIG. 7 shows a lighting device 310, which comprises a light source 410 and the 3D item 210 as illustrated in FIG. 5, or the 3D item 220 as illustrated in FIG. 6.

The 3D item 210 or 220 is a hollow cylinder, which, in FIG. 7, is shown as a cross section with a plane that coincides with axis B. The light source 410 is located in the interior space of the hollow cylinder, and it is arranged to emit light 411 towards the layer stack 140.

The 3D item 210 or 220 acts as a lampshade in the lighting device 310. For the lighting device 310, a lampshade is part of a housing of the device.

In operation, a first part of the light 411 that is emitted by the light source 410 is incident on the layer stack 140 at locations where no light transmissive particles 112 are present. At such locations, the light 411 cannot be transmitted through the layer stack 140. In other words, the first part of the light 411 is blocked by the lampshade. A second part of the light 411 is incident on the layer stack 140 at locations where one or more light transmissive particles 112 are present. At such locations, the light transmissive particles 112 form pinholes in the layer stack 140, allowing light to be transmitted through the layer stack 140 as transmitted light 412. In other words, the second part of the light 412 is transmitted by the lampshade.

In operation, the pinholes formed by the light transmissive particles 112 in the 3D item 210 or 220 of the lighting device 310 create relatively small virtual light sources on the surface of the 3D item 210 or 220, which provide a sparkling light effect for an observer looking at the lighting device 310.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by the same item of hardware. The mere fact that certain measures are recited in mutually different dependent claims does not indicate that a combination of these measures cannot be used to advantage.

The various aspects discussed in this patent can be combined in order to provide additional advantages. Further, the person skilled in the art will understand that embodiments can be combined, and that also more than two embodiments can be combined.

The invention claimed is:

1. A method of manufacturing a 3D item by means of fused deposition modeling,
   wherein the method comprises the step of depositing a 3D printable material to form a layer stack of 3D printed material, each layer of the layer stack having a layer height and a layer width,
   wherein the 3D printable material comprises a thermoplastic polymer and light transmissive particles,
   wherein the layer stack comprises a plurality of the light transmissive particles, each light transmissive particle having a particle width, being the dimension of the light transmissive particle in a direction parallel to the layer width,
   wherein, for the plurality of light transmissive particles, each ratio of the particle width and the layer width is larger than 1 so that, in the layer stack, the plurality of light transmissive particles forms a plurality of pinholes delimited by a wall part, and
   wherein the light transmissive particles are made from an elastically deformable material.

2. The method according to claim 1, wherein the wall part is diffusely transmissive, and wherein the light transmissive particles are transparent.

3. The method according to claim 1, wherein the wall part is opaque.

4. The method according to claim 1, wherein the wall part is transparent and has a first color, and wherein the light transmissive particles are transparent and have a second color different from the first color.

5. The method according to claim 1, wherein the 3D printable material is a filament of the thermoplastic polymer, and wherein the light transmissive particles are embedded in the filament.

6. The method according to claim 1 herein each light transmissive particle has a particle height, being the dimension of the light transmissive particle in a direction parallel to the layer height, and wherein, for the plurality of light transmissive particles, each layer height is larger than the particle height.

7. The method according to claim 1, wherein the light transmissive particles are glass particles or polymer particles.

8. The method according to claim 1, wherein the light transmissive particles are beads.

9. The method according to claim 1, wherein the light transmissive particles are colored particles.

10. A 3D item comprising a layer stack of 3D printed material, each layer of the layer stack having a layer height and a layer width,
wherein the 3D printed material comprises a thermoplastic polymer and light transmissive particles,
wherein the layer stack of 3D printed material comprises a plurality of the light transmissive particles, each light transmissive particle having a particle width, being the dimension of the light transmissive particle in a direction parallel to the layer width,
wherein, for the plurality of light transmissive particles, each ratio of the particle width and the layer width is larger than 1 so that, in the layer stack, the plurality of light transmissive particles forms a plurality of pinholes delimited by a wall part, and
wherein the light transmissive particles are made from an elastically deformable material.

11. The 3D item according to claim 10, wherein the plurality of the light transmissive particles is present in the layer stack of 3D printed material at a concentration in a range of 10 to 1000 particles per $cm^3$.

12. A lighting device comprising a light source and the 3D item according to claim 10, wherein the light source is arranged to emit light towards the layer stack of 3D printed material so that at least part of the light is transmitted through the light transmissive particles, and wherein the 3D item is configured as one or more of (i) at least part of a lighting device housing, (ii) at least part of a wall of a lighting chamber, and (iii) an optical element.

* * * * *